Patented Aug. 6, 1946

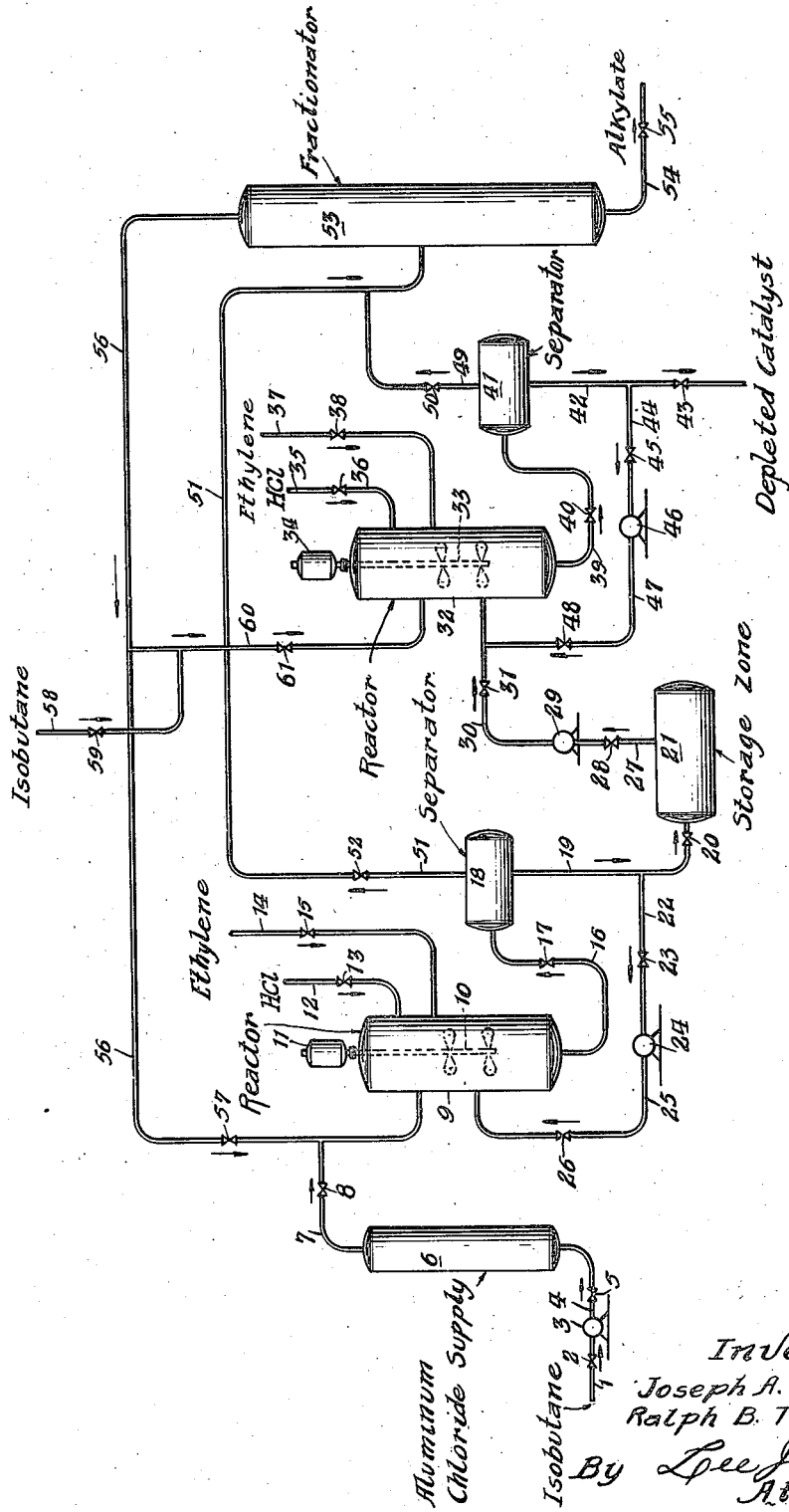

2,405,490

UNITED STATES PATENT OFFICE 2,405,490

ALKYLATION OF ISOPARAFFINS

Joseph A. Chenicek and Ralph B. Thompson, Riverside, Ill., assignors to Universal Oil Products Company, Chicago, Ill., a corporation of Delaware Application July 31, 1943, Serial No. 496,878

9 Claims. (Cl. 260—683.4)

This invention relates to a process for the alkylation of paraffinic hydrocarbons with olefinic hydrocarbons in the presence of a liquid aluminum chloride-hydrocarbon complex. It is more particularly concerned with a novel method for utilizing an aluminum chloride-hydrocarbon complex as a catalyst in the alkylation of isobutane with ethylene.

The use of aluminum chloride particularly in conjunction with hydrogen chloride, in the catalytic alkylation of paraffins with olefins to produce higher molecular weight branched chain paraffins is well-known in the art. However, aluminum chloride is an extremely active catalyst with the result that it is often difficult to obtain a high degree of selectivity of reaction. Various decomposition and condensation reactions accompanying the use of aluminum chloride often result in relatively low yields of desired alkylation products and an excessive catalyst consumption for a given yield of desired product.

We have found that isoparaffins can be alkylated with olefins, particularly isobutane with ethylene, in a convenient and efficient manner and with yields of desired products if the aluminum chloride is employed in the form of a liquid aluminum chloride-hydrocarbon complex. Furthermore, we have also found that unexpected and improved results can be obtained by employing the liquid aluminum chloride-hydrocarbon complex catalyst in a two-stage method of operation hereinafter described in greater detail.

One object of the present invention is to obtain the most efficient use of an aluminum chloride-hydrocarbon complex when used as a catalyst for the alkylation of isoparaffins with olefins. Another object of the invention is to provide an improved process for the production of valuable hexanes, particularly 2,3-dimethylbutane, by the alkylation of isobutane with ethylene. A still further object of the invention is to obtain maximum efficiency from an aluminum chloride-hydrocarbon complex when employed as an alkylation catalyst by depleting the activity of said catalyst to the lowest feasible level.

Broadly, the invention comprises alkylating a paraffinic hydrocarbon with an olefinic hydrocarbon in a two-stage system wherein an aluminum chloride-hydrocarbon complex of substantially constant aluminum chloride content is utilized as the catalyst in the first alkylation stage and the discarded catalyst from said first stage is further employed in a second alkylation stage wherein its aluminum chloride content is depleted to the lowest practical level.

In one specific embodiment the invention comprises alkylating isobutane with ethylene in the presence of a liquid aluminum chloride-hydrocarbon complex in a first alkylation zone, separating said aluminum chloride-hydrocarbon complex from the hydrocarbon reaction products, recycling a portion of said separated aluminum chloride-hydrocarbon complex to said first alkylation zone, supplying controlled amounts of fresh aluminum chloride to said first alkylation zone whereby to maintain the aluminum chloride content of the aluminum chloride-hydrocarbon complex in said zone substantially constant at a value above about 65% but less than about 85% by weight, introducing the remaining portion of said separated aluminum chloride-hydrocarbon complex to a second alkylation zone wherein the alkylation of additional isobutane with ethylene is effected, separating hydrocarbon reaction products from the aluminum chloride-hydrocarbon complex employed in said second alkylation zone, and discarding from the system the aluminum chloride-hydrocarbon complex separated in said last named step, said discarded complex having an aluminum chloride content substantially lower than the aluminum chloride content of the complex employed in said first alkylation zone but not less than about 65% by weight.

The alkylation of isobutane with ethylene in the presence of hydrogen chloride and an aluminum chloride-hydrocarbon complex as a catalyst provides a method for the synthesis of 2,3-dimethylbutane. The latter hydrocarbon is a branched chain hexane having extremely valuable antiknock properties and it finds important application as a component of aviation gasoline and other motor fuels. As it will be described hereinafter in greater detail, the aluminum chloride-hydrocarbon complex which is employed in the process of the present invention consists essentially of the complex formed inherently when isobutane, ethylene, aluminum chloride, and hydrogen chloride are contacted under alkylating conditions. In order to obtain the optimum yield of 2,3-dimethylbutane it is necessary to carry out the alkylation of isobutane with ethylene in the presence of an aluminum chloride-hydrocarbon complex which has an aluminum chloride content within the range of from about 65% to about 85% by weight.

As is the case with other liquid alkylation catalysts, the aluminum chloride-hydrocarbon complex catalyst upon continued use gradually becomes contaminated or diluted with hydrocarbons or other organic material. As a result, the aluminum chloride content of the complex declines with a corresponding drop in alkylating activity. When the aluminum chloride content of the complex has decreased to a minimum of about 65% by weight the catalyst is no longer efficient for the alkylation of isobutane with ethylene since the yield of the alkylate drops markedly. To some extent it is possible to compensate for the decline in activity of the aluminum chloride-hydrocarbon complex by refortifying the spent catalyst with fresh aluminum chloride. However, we have discovered that an aluminum chloride-hydrocarbon complex of almost depleted activity cannot be restored completely to optimum activity merely by the addition of fresh aluminum chloride.

Much greater catalyst efficiencies and higher yields of 2,3-dimethylbutane can be obtained if the activity of the catalyst within the alkylation zone is maintained at a substantially constant level throughout the process as contrasted with the method of operation wherein the activity of the complex catalyst is allowed to be almost depleted before fresh aluminum chloride is added. Operation with an aluminum chloride-hydrocarbon complex of substantially constant activity is readily achieved by the continuous addition of controlled amounts of fresh aluminum chloride to the alkylation zone and the continuous removal of a suitable portion of aluminum chloride-hydrocarbon complex from the system. The addition of the fresh aluminum chloride to the alkylation zone results in the formation in situ of additional aluminum chloride-hydrocarbon complex by contact with the hydrogen chloride, isobutane, and ethylene charged to the alkylation zone. The volume and activity of the aluminum chloride-hydrocarbon complex within the alkylation zone is maintained substantially constant by the continuous removal of a portion of the catalyst in order to compensate for the additional complex formed in situ. By properly correlating the rate of addition of fresh aluminum chloride and the rate of withdrawal of aluminum chloride-hydrocarbon complex from the alkylation system, the aluminum chloride content of the catalyst can be maintained at a substantially constant level within the desired range.

Since satisfactory catalyst efficiencies and satisfactory yields of 2,3-dimethybutane are obtained when operating with a complex catalyst having substantially any aluminum chloride content in the range of from about 65% to about 85% by weight, it might be assumed upon superficial consideration that the most efficient use of the catalyst would be obtained by operating at a substantially constant aluminum chloride content near the minimum value of 65 weight per cent. In other words, it might be assumed that by thus depleting the activity of the aluminum chloride-hydrocarbon complex to the lowest feasible value the greatest catalyst efficiency would be obtained in terms of yield of valuable products per unit of aluminum chloride consumed. However, we have discovered that a much more efficient operation results if the alkylation reaction is carried out in two stages. In the first stage an aluminum chloride-hydrocarbon complex of substantially constant activity is employed by maintaining an aluminum chloride content within the upper portion of the 65–85 weight per cent range. The aluminum chloride-hydrocarbon complex withdrawn from the first stage (having an aluminum chloride content, for example, of 75–80 weight per cent) is then employed in a second alkylation stage wherein it is utilized until its aluminum choride content has been depleted to a substantially lower value which in any case is not less than about 65% by weight. Furthermore, we have observed that the quality of the alkylates obtained from the two reaction stages is substantially the same and, therefore, they can be combined for fractionation or other desired treatment.

The method of operation of the present invention will become more evident in the accompanying drawing which represents one arrangement of apparatus whereby the process may be carried out.

Referring to the drawing, an isobutane fraction is charged through line 1 containing valve 2 to pump 3 which discharges through line 4 containing valve 5 into a pickup chamber 6 containing a bulk supply of granular aluminum chloride. If desired the catalyst may be present in pickup zone 6 as a liquid, a binary or ternary mixture with other metal halides, or as an adsorbed layer on an adsorbent material such as fire brick, silica, etc. In zone 6 the temperature, pressure, and quantity of isobutane passing therethrough are controlled to effect substantial saturation of the isobutane fraction with aluminum chloride and thereby to carry over the amount of aluminum chloride required to maintain the desired catalyst activity in the subsequent alkylation step.

Although only one pickup zone is shown in the drawing more than one may be employed simultaneously or intermittently. Thus, while the isobutane carrier fluid is being directed through zone 6 another similar zone may be emptied, cleaned, and refilled with a fresh charge of catalyst to be used at a later time. It is also possible to employ carrier fluids other than isobutane provided the aluminum chloride is sufficiently soluble therein and is substantially non-reactive with the fluid chosen. For the sake of simplicity heating steps have been omitted from the drawing but it will be evident that the isobutane or other carrier fluid introduced through line 4 into pickup zone 6 must be heated to a suitable temperature in order to carry over the desired amount of aluminum chloride to the alkylation zone. The pickup zone itself may be provided with suitable heating means if desired. Zone 6 is preferably operated under sufficient pressure to maintain a substantial portion of the isobutane or other carrier fluid in the liquid phase.

From the pickup zone 6 the isobutane fraction containing dissolved aluminum chloride is directed through line 7 containing valve 8 and thence through line 56 into the first alkylation zone 9. Hydrogen chloride is added through line 12 containing valve 13; ethylene is added through line 14 containing valve 15; and catalyst is introduced from recycle line 25 containing valve 26. Alkylation zone 9 is depicted as a mechanically agitated reaction zone containing stirring device 10 operated by motor 11. Obviously, however, any other apparatus which is effective in producing intimate contact between the catalyst and hydrocarbons may be employed. The alkylation zone may be equipped with suitable cooling means not shown in order to control the exothermic alkylation reaction. The reaction mixture is withdrawn through line 16 and valve 17 to a separator or gravity settler 18. An upper hydrocarbon products layer is withdrawn through line 51 and valve 52 to further treatment hereinafter described. A lower catalyst layer comprising the aluminum chloride-hydrocarbon complex is withdrawn through line 19 and a substantial portion thereof is recycled to the alkylation zone through line 22 containing valve 23, pump 24, and line 25 containing valve 26.

As a result of extended experimental observations it has been found that in order to obtain the optimum yield of isobutane-ethylene alkylate containing the optimum amount of desired hexane fraction it is necessary to maintain the aluminum chloride content of the aluminum chloride-hydrocarbon complex at not less than about 65% by weight and not more than about 85% by weight. If the aluminum chloride content of the complex is depleted to less than about 65% by weight, the yield of alkylation products falls off markedly. On the other hand, if the aluminum chloride content of the complex exceeds about 85% by weight, the selectivity of the reaction declines and the per cent of hexane in the total alkylate decreases rapidly.

In order to maintain the aluminum chloride content of the aluminum chloride-hydrocarbon complex in alkylation zone 9 within the optimum range hereinbefore described the desired amount of aluminum chloride is supplied from zone 6 and additional quantities of aluminum chloride-hydrocarbon complex are formed in situ. By withdrawing a suitable portion of aluminum chloride-hydrocarbon complex through line 19 and valve 20 to storage zone 21 it is possible to maintain in zone 9 a substantially constant volume of catalyst having a substantially constant activity within the optimum range. In the process of the present invention the aluminum chloride-hydrocarbon complex thus withdrawn to storage zone 21 is introduced through line 27 containing valve 28 to pump 29 which discharges through line 30 containing valve 31 into a second alkylation zone 32 provided with stirrer 33 driven by motor 34. Isobutane is introduced into said alkylation zone through line 60 containing valve 61; hydrogen chloride is added through line 35 containing valve 36; and ethylene is introduced through line 37 containing valve 38. The reaction mixture is directed through line 39 and valve 40 to settling zone 41. The second alkylation stage of the process is operated batchwise with respect to the catalyst, and the lower aluminum chloride-hydrocarbon complex layer is recycled to the alkylation zone through line 42, line 44 containing valve 45, pump 46, and line 47 containing valve 48. Recycling of a batch of catalyst is continued until its aluminum chloride content approaches 65% at which time the catalyst may be withdrawn from the system through valve 43.

The hydrocarbon reaction products from separator 41 are removed through line 49 containing valve 50 and combined in line 51 with similar products obtained from separator 18 in the first stage of the process. The combined reaction products are fractionated in fractionating column 53. An unconverted isobutane fraction is removed overhead through line 56 and may be recycled in part through valve 57 to alkylation zone 9 or through line 60 and valve 61 to alkylation zone 32. If desired an additional source of isobutane for zone 32 may be provided by means of line 58 containing valve 59. The alkylation products are removed through line 54 and valve 55 to further fractionation steps not shown wherein normal butane may be separated and a desired hexane fraction recovered from higher boiling alkylation products. For the sake of simplicity the condenser, receiver, reboiler, etc., usually associated with fractionating columns have been omitted from the drawing.

In most cases the ethylene introduced into the alkylation zones through lines 14 and 37 will be contaminated with ethane or other low boiling hydrocarbons and it will be necessary to provide means in line 56 for separating ethane or other low boiling hydrocarbons from the recycled isobutane.

As hereinbefore described, it is necessary to maintain the aluminum chloride content of the aluminum chloride-hydrocarbon complex employed in alkylation zone 9 within the range of from about 65% to about 85% by weight in order to obtain optimum alkylation of isobutane with ethylene. Moreover, it is desirable to maintain this aluminum chloride content substantially constant. In alkylation zone 32 the aluminum chloride-hydrocarbon complex discharged from zone 9 is depleted to the lowest feasible level, usually about 65% by weight of aluminum chloride. The temperature to be employed in each alkylation step will, of course, depend somewhat upon the aluminum chloride content of the catalyst but the alkylation temperature will usually be within the range of from about 50° F. to about 170° F. and preferably within the narrow range of from about 100° F. to about 140° F. In general, the higher the aluminum chloride content of the catalyst the lower the temperature should be for optimum 2,3-dimethylbutane production. The aluminum chloride content of the catalyst is generally calculated from $Al_2O_3$ analysis according to the standard gravimetric procedure. Inorganic chlorine determinations may be conducted by the well known Volhard method.

The temperature in pickup zone 6 and the quantity of isobutane or other carrier fluid passing therethrough should be such that sufficient aluminum chloride is introduced into reactor 9 to counteract the depreciation of the aluminum chloride-hydrocarbon complex and thereby maintain a substantially constant catalyst activity. In general, the pickup zone temperature will be within the range of from about 100° F. to about 200° F., but in any particular case the temperature used must be correlated with the nature and quantity of carrier fluid passing through the zone.

It will be evident from the foregoing description of our process that because of the in situ formation of aluminum chloride-hydrocarbon complex in the first alkylation zone the catalyst employed consists essentially of the complex formed inherently when isobutane, ethylene, aluminum chloride, and hydrogen chloride are contacted under alkylating conditions. However, during the initial start up of the process it may be desirable to charge to the system any convenient aluminum chloride-hydrocarbon complex prepared outside of the system. For example, complex catalysts suitable for an initial charge to the system can be prepared by contacting aluminum chloride, in the presence or absence of hydrogen chloride, with ethylene or other olefins including polymers, with paraffinic hydrocarbons such as iso-octane or straight run kerosene, with aromatics such as benzene, or with various other hydrocarbons, hydrocarbon fractions, or mixtures thereof. As the process is operated in a continuous manner the catalyst originally charged to the system will eventually be displaced by the aluminum chloride-hydrocarbon complex formed in situ.

Contamination of the bulk supply of aluminum chloride in the pickup zone should be avoided by keeping the olefin content of the pickup fluid as low as possible. Pressure on the system should be sufficiently high to keep the reactants in substantially the liquid phase. The pickup zone should also be operated in the liquid phase when butane is used as the carrying medium since ordinarily butane vapors cannot carry sufficient aluminum chloride into the system. The propane content of the charging stock should be low enough so that a liquid phase can be maintained at the temperatures of the pickup and reaction zones without resorting to excessively high pressures.

In order to obtain optimum yields of 2,3-dimethylbutane the hydrogen chloride concentration should not exceed about 3 mol per cent of the hydrocarbons charged since quantities in excess of about 3 mol per cent have been found to cause excessive pentane production at the expense of the valuable $C_6$ fraction. An isobutane to ethylene molar ratio of not less than about 4.0 is desirable in order to obtain complete reaction of all the olefins charged to the process.

In order to demonstrate the fact that higher overall yields and greater catalyst efficiencies are obtainable in the two-stage process of the present invention the following examples are presented. However, it is not intended to limit the scope of the invention in any way by these examples.

Example I

In this case a single reactor system is employed. The aluminum chloride-hydrocarbon complex is preformed outside of the system by contacting isobutane, ethylene, hydrogen chloride, and aluminum chloride at a temperature of 130–140° F. As charged initially the catalyst has an aluminum chloride content of 76% by weight, but during the course of the run this catalyst is depleted to an aluminum chloride content of 65% by weight.

The reaction system is charged with 1000 pounds of the aluminum chloride-hydrocarbon complex containing 76% by weight of aluminum chloride, and isobutane is alkylated with ethylene at a temperature of 125° F. and a pressure of 250 pounds per square inch. The molar ratio of isobutane to ethylene in the hydrocarbons charged is 5:1, and about 2.0 mol per cent of hydrogen chloride is employed based on the hydrocarbons charged. This catalyst is utilized without the addition of fresh aluminum chloride until the aluminum chloride content has been depleted to 65% by weight at which time a total of 32,960 gallons of alkylate containing 80% by volume of hexanes has been produced.

The aluminum chloride-hydrocarbon complex in the system now weighs 1170 pounds and contains 65% by weight of aluminum chloride. In order to refortify this complex and obtain 1000 pounds of the original catalyst containing 76% by weight of aluminum chloride it is necessary to discard 485 pounds of the complex and to add 315 pounds of fresh aluminum chloride to the remaining 685 pounds of depleted catalyst. The efficiency of the process in this method of operation is 104.6 gallons of alkylate produced per pound of aluminum chloride consumed.

Example II

In this case the process is operated according to the two-stage method of the present invention and particularly as depicted in the drawing. Two reactors are employed in the first of which a constant amount of 1000 pounds of aluminum chloride-hydrocarbon complex having an aluminum chloride content of 76% by weight is maintained. In the second reactor an aluminum chloride-hydrocarbon complex containing 76% by weight of aluminum chloride as removed from the first reactor is employed. In this zone no fresh aluminum chloride is added and the complex containing 76% by weight of aluminum chloride is depleted to 65 weight per cent aluminum chloride content in much the same manner of operation as described in Example I.

The first reaction zone is operated at substantially the same temperature, pressure, isobutane to ethylene ratio, and hydrogen chloride concentration as are used in connection with Example I. Fresh aluminum chloride is continuously introduced into the first reactor from a pickup zone at a rate such that the aluminum chloride content of the 1000 pounds of catalyst contained therein is maintained at 76 per cent by weight. Catalyst of 76 weight per cent aluminum chloride is continuously withdrawn to the second reactor at a rate such that 1000 pounds is always present in the first reactor.

When operating in this manner 22,050 gallons of alkylate containing 80% by volume of hexanes are produced in the first reactor after 315 pounds of aluminum chloride has been added. In the meantime 414.5 pounds of aluminum chloride-hydrocarbon complex have been withdrawn to the second reactor wherein the aluminum chloride content of the catalyst is depleted to 65% by weight with the additional production of 13,650 gallons of isobutane-ethylene alkylate. A total of 485 pounds of aluminum chloride-hydrocarbon complex containing 65% by weight of aluminum chloride is then discarded from the system. The alkylation temperature in the second reactor may be somewhat higher than that employed in the first reactor but the other operating conditions may be substantially the same.

The efficiency of the two-stage method of operation is 113.3 gallons of alkylate produced per pound of aluminum chloride consumed. It is thus evident that in the two-stage method of operation much more efficient use is obtained of the aluminum chloride charged to the process.

We claim as our invention:

1. An alkylation process which comprises reacting an isoparaffin with an olefin in the presence of an aluminum chloride-hydrocarbon complex in a first alkylation stage and separating resultant hydrocarbon alkylate from said complex, introducing controlled amounts of fresh aluminum chloride into the first alkylation stage and withdrawing from said stage controlled amounts of aluminum chloride-hydrocarbon complex whereby to maintain a substantially constant aluminum chloride content of the aluminum chloride-hydrocarbon complex within said first stage, introducing said withdrawn aluminum chloride-hydrocarbon complex and additional isoparaffin and olefin to a second alkylation stage wherein said complex is employed as an alkylation catalyst without the addition of fresh aluminum chloride, and removing from said second alkylation stage an aluminum chloride-hydrocarbon complex of substantially depleted alkylating activity.

2. A process for the production of 2,3-dimethylbutane which comprises alkylating isobutane with ethylene in the presence of a liquid aluminum chloride-hydrocarbon complex in a first alkylation zone, separating said aluminum chloride-hydrocarbon complex from the hydrocarbon reaction products, recycling a portion of said separated aluminum chloride-hydrocarbon complex to said first alkylation zone, supplying controlled amounts of fresh aluminum chloride to said first alkylation zone whereby to maintain the aluminum chloride content of the aluminum chloride-hydrocarbon complex in said zone substantially constant at a value above about 65% but less than about 85% by weight, introducing the remaining portion of said separated aluminum chloride-hydrocarbon complex to a second alkylation zone wherein the alkylation of additional isobutane with ethylene is effected, separating hydrocarbon reaction products from the aluminum chloride-hydrocarbon complex employed in said second alkylation zone, and discarding from the system the aluminum chloride-hydrocarbon complex separated in said last named step, said discarded complex having an aluminum chloride content substantially lower than the aluminum chloride content of the complex employed in said first alkylation zone but not less than about 65% by weight.

3. The process of claim 2 wherein said controlled amounts of fresh aluminum chloride are supplied to said first alkylation zone by passing isobutane through a pickup zone containing a bulk supply of granular aluminum chloride under conditions such that the desired amount of aluminum chloride is dissolved in said isobutane and introducing the effluent solution of aluminum chloride in isobutane into said first alkylation zone.

4. The process of claim 2 wherein hydrogen chloride is supplied to both alkylation zones.

5. The process of claim 2 wherein said alkylation of isobutane with ethylene is conducted at a temperature within the range of from about 50° F. to about 170° F., under sufficient pressure to maintain a substantial portion of the hydrocarbon reactants in the liquid phase, in the presence of a substantial amount but not more than about 3 mol per cent of hydrogen chloride based on the hydrocarbons charged, and at a mol ratio of isobutane to ethylene in the hydrocarbons charged of not less than about 4.0.

6. The process of claim 2 further characterized in that the hydrocarbon reaction products from said first and second alkylation zones are fractionated, unconverted isobutane is recycled to at least one of said alkylation zones, and 2,3-dimethylbutane is recovered from the remaining alkylation products.

7. An alkylation process which comprises reacting an isoparaffin with an olefin in the presence of an aluminum chloride-hydrocarbon complex in a first reaction stage and separating resultant hydrocarbon alkylate from the catalyst complex, introducing fresh aluminum chloride to and withdrawing catalyst complex from said stage at rates such as to maintain the aluminum chloride content of the complex in the reaction stage at a substantially constant value above about 65% but less than about 85% by weight, commingling additional isoparaffin and olefin with the withdrawn catalyst complex containing in excess of 65% by weight of aluminum chloride and subjecting the resultant mixture to alkylating conditions in a second reaction stage, employing said withdrawn complex as the alkylating catalyst in the second stage until its aluminum chloride content has been reduced to about 65% by weight, and then withdrawing the complex from said second stage.

8. The process as defined in claim 7 further characterized in that the isoparaffin and olefin supplied to said first stage comprise, respectively, isobutane and ethylene.

9. The process as defined in claim 7 further characterized in that the isoparaffin and olefin supplied to both said stages comprise, respectively, isobutane and ethylene.

JOSEPH A. CHENICEK.
RALPH B. THOMPSON.